Dec. 4, 1962
R. J. MATT
3,066,654
OSCILLATORY ACTUATOR SEAL
Filed May 3, 1960
2 Sheets-Sheet 1
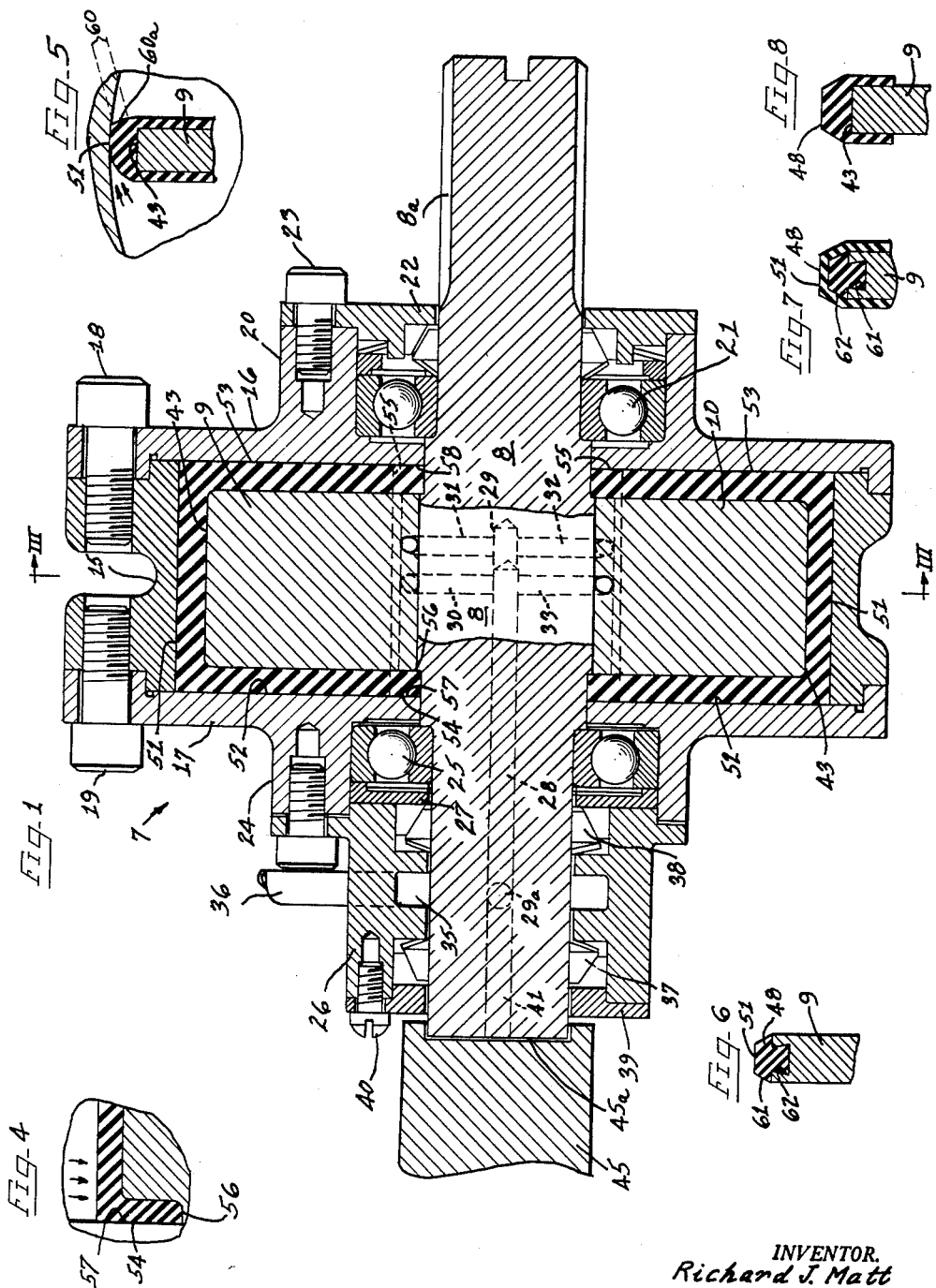
INVENTOR.
Richard J. Matt
BY
Attys.

Dec. 4, 1962

R. J. MATT 3,066,654

OSCILLATORY ACTUATOR SEAL

Filed May 3, 1960

INVENTOR.
Richard J. Matt
BY

United States Patent Office 3,066,654
Patented Dec. 4, 1962

3,066,654
OSCILLATORY ACTUATOR SEAL
Richard J. Matt, South Euclid, Ohio, assignor to Thompson Ramo Wooldridge, Inc., Cleveland, Ohio, a corporation of Ohio
Filed May 3, 1960, Ser. No. 26,592
6 Claims. (Cl. 121—99)

This invention relates to seal means and is more particularly directed to improved methods and means for sealing oscillatory actuators and the like.

Heretofore pneumatically and hydraulically operated servomechanisms have been employed for actuation of flight stabilization and control components, such as ailerons and other flight control surfaces and means, of air and space-borne vehicles.

It has been customary in the art to employ oscillatory servomechanisms rather than linear servomechanisms, since almost all desired applications require a rotary motion, therefore the simplest way of providing such motion is by use of an oscillatory actuator. Moreover, since most applications require an oscillating motion through small angles, several sets of vanes may be mounted on the actuator rotor providing thereby the maximum torque output for any given actuator configuration. Still another factor contributing to the preference of oscillatory actuators is that the mass of the actuator is balanced about the center of rotation and thus actuator performance is unaffected by linear vibrations induced during actual flight conditions.

However, along with the above advantages of oscillatory actuators, the one common disadvantage thereof must be accepted—that of sealing. Briefly stated it is much more difficult to seal a square vane than a round piston.

Since oscillatory motion is imparted to the actuator rotor by pneumatic or hydraulic differential pressure exerted against the vanes carried by the actuator rotor, seal means are required for not only the periphery of each actuator vane but also in the rotor body to assure leakproof pressure compartments on opposed sides of each vane. Prior attempts to provide reliable sealing included employment of spring-loaded wiper seals seated in grooves formed in the rotor and in the vanes. However, wiper seals depend upon a flat metal-to-metal surface between the actuator housing and the wiper seal surface thus requiring extensive machining and finishing and thereby the costs of manufacturing the actuators were increased considerably. Another problem associated with use of wiper type seals was that break away friction was quite high and wear caused thereby between the seal and housing tended to permit leakage across the seals from one vane compartment to another and thereby affected optimum performance not only of the actuator and attached control surface but also the performance of the air or space-borne vehicle in which the servomechanism was employed. The effects of vehicle vibration on spring-backed wiper seals are self-evident. In addition to the foregoing disadvantages a particularly difficult area to seal by any means is the flat corners between the actuator end walls and the rotor.

I substantially overcome the difficulties and problems of the prior art by providing an actuator, the rotor and vanes of which are encased in an elastomeric material bonded thereto thus eliminating the requirement for any other sealing means for the pressurizing medium compartments on opposed sides of the vanes.

It is therefore an important aim of the present invention to provide improved seal means for oscillatory servomechanisms.

It is another object of the present invention to provide servomechanisms for actuating movement of flight control and stabilization means for rockets, missiles and related air and space-borne vehicles.

It is still another object of the present invention to provide servomechanism actuators having vane chambers rendered pressurizable by seal means provided only on the rotor and vanes of the actuator.

It is a further object of the present invention to provide means for sealing pressure medium compartments of a servomechanism actuator which are bonded only to the vanes and rotor of the actuator.

It is still a further object of the present invention to provide means for sealing oscillating vanes of a rotor actuator by bonding an elastomeric material to the periphery of the vanes for wiping contact with the housing of the actuator.

It is yet another object of the present invention to provide new and novel methods of sealing pressure compartments of oscillatory actuators.

It is another object of the present invention to provide sealing means for rotary actuators which are simple and compact in construction, and efficient in operation.

These, other and further features and advantages of the present invention will become more apparent upon a careful consideration of the following detailed description, when considered in conjunction with the accompanying drawing illustrating preferred embodiments of my invention, wherein like reference characters and numerals refer to like or corresponding parts throughout the several views.

On the drawing:

FIGURE 1 is a view in longitudinal section of apparatus embodying the novel seal means of the present invention;

FIGURE 4 is an enlarged fragmentary view illustrating the end face sealing feature of my invention;

FIGURE 5 is an enlarged fragmentary view illustrating the novel vane periphery seal feature of the present invention;

FIGURE 6 is a view in partial cross section illustrating another embodiment of the periphery seal means;

FIGURE 7 is a view illustrating still another embodiment of vane periphery seals, and FIGURE 8 is a view illustrating another embodiment of vane periphery seals.

As shown on the drawing:

As appears in FIGURE 1, a hydraulically or pneumatically operated servomechanism actuator unit is shown which may be provided with the novel seal means of the present invention.

Figure 3:
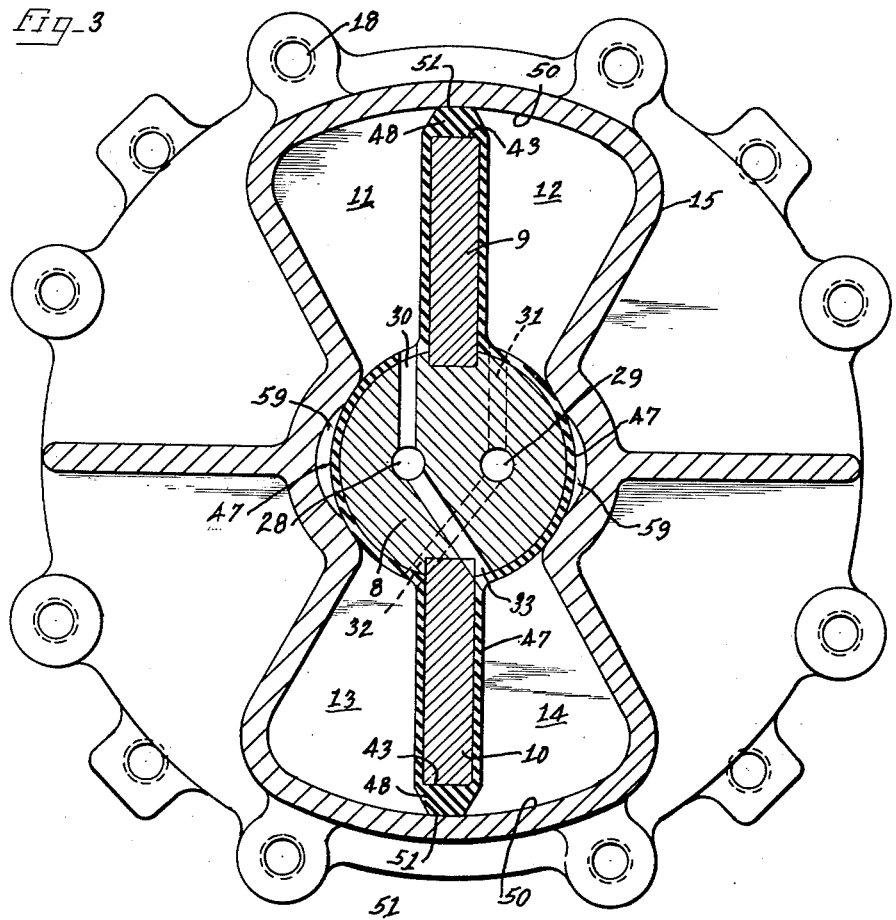
FIGURE 3 is a view taken along lines III—III of FIGURE 1.

The actuator comprises, in general, a housing 7 defining a pair of branch chambers radiating from a centrally located chamber which is adapted to receive a rotor 8, the rotor shaft 8a of which carries a pair of diametrically opposed vanes 9 and 10. Vane 9 separates one of the branch chambers into a pair of opposed pressurizing medium compartments 11 and 12, whereas vane 10 separates the other branch chamber into a pair of compartments 13 and 14 (FIGURE 3). It will be understood that the present invention has applicability to servomechanism actuators having multiple vanes operating on similar principles as well as the specific apparatus shown in the drawing hereof.

The actuator housing 7 may be constructed in three major portions including a central portion 15 and end plates 16 and 17 assembled as by suitable securing means 18 and 19.

End plate 16 may be provided with a suitable boss 20 adapted to receive shaft bearing means 21 which may be of the angular spring-loaded type, as shown. A closure plate 22 is provided and is secured to the boss 20 as by screws 23 or other suitable securing means. Similarly, end plate 17 is provided with a boss 24 adapted to receive angular spring-loaded shaft bearing means 25.

A removable housing 26, spaced from the bearing means 25 by a divider 27, is employed for introducing pressurizing medium from a pressure source (not shown) through a pair of actuator shaft formed passages 28 and 29 and communicating branch passages 30—33 into the vane compartments 11, 12, 13 and 14, respectively (FIGURE 3). For this purpose, housing 26 is provided with an annular passage 35 communicating with branch passages 28a and 29a and an inlet passage 36 which may be positioned for tangentially introducing pressurizing medium into passage 35. Appropriate seal means 37 and 38 are provided to prevent leakage from passage 35 across the rotor shaft 8a. An end plate 39 secured to housing 26 by suitable means, such as screw 40, completes the assembly.

Pressure conditions, and thus oscillatory movement of the vanes and rotor shaft, may be controlled by varying the pressure conditions in passages 28 and 29, respectively. A pair of bleed outlets 41 and 42 communicating with compartment supply passages 28 and 29, respectively, are provided for this purpose. Thus, by blocking the discharge area of one of the bleed conduits, pressure will be increased in the vane compartments communicating therewith and cause movement of the rotor in the direction of low pressure. Similarly, subsequent blocking of the other bleed outlet will tend to equalize the pressure in the compartments on both sides of the vanes and return the rotor to its original position relative to the housing.

Alternately, means such as a torque motor shaft 45 having a cam surface complementary to a cammed surface provided on the end of the actuator shaft 45a may be employed to effect pressure changes in the bleed outlet passages 41 and 42, respectively. For example, when the torque motor (not shown) is energized causing rotation of the shaft 45, the area ahead of one of the bleed outlets will be opened and the area behind the other bleed outlet will be closed proportionately, thereby causing a pressure differential in the bleed outlets, assuming the original relationship between the cam surface of the torque motor shaft and cam surface of the actuator shaft was such as to provide equal pressure conditions in the pair of bleed outlets.

It is to be understood that any suitable means which may be employed to vary the pressure conditions in the bleed outlets are contemplated within the concepts of the present invention.

From the foregoing, it will be appreciated that, for successful operation of the servomechanism unit, sealing means must be provided in the following locations: (a) around the periphery of the vane surfaces, (b) between adjacent vane compartments, and (c) along the rotor shaft.

Figure 2:
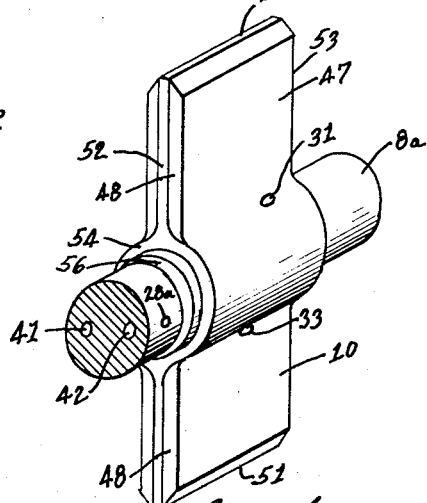
FIGURE 2 is a perspective view in partial section of the vaned rotor of FIGURE 1.

As appears in FIGURE 2, all sealing means are provided on the vanes and rotor thus eliminating the requirement for recesses or grooves formed in the other components of the actuator assembly. As shown in FIGURE 2, an abrasion resistant elastomeric material 47 completely covers the vanes and rotor. By thus coating and encasing the vanes and rotor in elastomeric material, corrosion effect of the hydraulic or pneumatic pressurizing medium is considerably reduced. Furthermore, the pressure forces applied against the seal are unable to undermine and unseat the seal as is possible where conventional spring-backed wiper seals are employed.

In order to seal along the peripheral surfaces of the vanes, the elastomeric material may be molded to the surface thereof to provide a wiper section 48, preferably as appears in FIGURE 3. The wiper section 48 convergingly tapered to a flat housing contacting surface does not tend to abrade nor is it subjected to high stresses due to excessive flexing, since the wiper section 48 is designed to slide freely over the finished inner arcuate surface 50 of the housing branch chambers (FIGURE 3).

The wiper section 48 extends longitudinally the full length of the vane surface 43 and continues along both parallel surfaces 52 and 53 adjacent surface 51. Wiper sections 52 and 53 merge with end face seals 54 and 55 concentric with the rotor and located at opposite ends of the vanes. The end face seals 54 and 55 may extend the full width of the stepped portion 56 of the rotor and are provided with a flat outer surface for surface area engagement with the housing surfaces 57 and 58.

As aforesaid the elastomeric coating is continuous over the rotor and the opposed surfaces of each vane.

The centrally located rotor housing chamber 59 is provided with an arcuate inner surface constructed so that only line contact at four equidistant points in section is made between the housing and rotor seal means (FIGURE 3). Thus a continuous seal is provided between the housing and rotor regardless of the relative position of the rotor in the housing.

The periphery of the vanes and housing are effectively sealed by the abrasion resistant elastomeric material convergingly tapered as shown in FIGURE 3 which is dimensionally related to the housing so that the substantially flat wiper seal surface 51 slides freely over the polished surface 50 of the actuator housing. The tapered wiper surface 51 provides a positive low friction seal, and, because of its tapered configuration and flat contacting surface, is not subjected to high stresses due to flexing caused by continuous oscillation of the rotor vanes during operation.

It will be appreciated that for the high pressure applications for which the apparatus of FIGURE 1 is intended, such as operation of flight control surfaces of air and space-borne vehicles, employment of a peripheral elastomeric wiper seal V-shaped in cross section would be ineffective. For example, the pressure exerted on the ends or lips of the seal in line contact with the housing would be subjected to high stresses due to such excessive flexing and would soon abrade to an extent that they would be ineffective and require replacement.

By tapering each side of the wiper seal as appears in FIGURE 3, only one corner of the seal defined by the taper and adjacent portion of the flat surface contacting the housing would be subjected to stresses and deform as shown in FIGURE 5, depending of course upon the direction of movement of the vane. The taper also provides a space 60 shown by the dotted lines which permits the low pressure forces to act against the corner of the wiper seal 60a which is slightly deformed thereby, thus further deforming the seal area and assuring continuous surface-to-surface contact between the deformed portion of the wiper seal and the housing surface 50. The novel wiper seal means for the periphery of the vanes permits high stress distortion of only a portion of the surface contacting the housing, and, in addition, because of the resilient characteristics of the seal material, has the same desirable characteristics of a spring-loaded wiper seal. The flat surfaces of the seal are thus intersected by opposed pressure surfaces which are at an angle of from 20° to 40° to the plane of the vane, with the flat surfaces being substantially perpendicular to the plane.

The leakproof features of the cooperating surfaces of the rotor bonded seal in line contact with the housing surfaces has already been discussed, and leakproofing of the vane chambers is completed by the end face seal 54 in surface area contact with the end plates 16 and 17 as shown in FIGURE 4, and end face seal 55.

Sealing between the surfaces of the end plates 16 and 17 and the end seals 54 and 55, respectively, prevent gas leakage from the compartments along the shaft.

The end face elastomeric seals 54 and 55 effect their seal through pressure induced compression against the end plates 16 and 17 (FIGURE 4).

It will be appreciated that the seal between the end plates and end face seals 54 and 55 is positively assisted by the fluid pressure forces acting in the respective vane compartments to distort the elastomeric material on the rotor which, in turn, induce distortion in the end face seals integral therewith. In addition, the tapered surfaces of the wiper seals at the position where the wiper seals merge with the end face seals 54 and 55 provide a space for the application of main compartment pressure forces on the adjacent surfaces of the end face seals.

If desired, wiper seals of elastomeric material may be press fitted into keyed slots or grooves along the periphery of the vanes, and, then, the coating layer of elastomeric material applied to the vanes and rotor including a coating over the wiper seals as shown in FIGURE 7.

Optionally, the rotor portion and end faces of the rotor may be provided with a bonded coating of elastomeric material, and only a strip of elastomeric material provided over the vane peripheries tapered as shown in FIGURE 8. In addition, the elastomeric seal material may be keyed into a slot provided in the periphery of the vanes as shown in FIGURE 6, and the rotor and rotor end face surfaces sealed as shown in FIGURE 1. However, the modification shown in FIGURE 6 has limited utility since high pressure applications would tend to undermine the seal if the bond between the rotor surface and elastomeric material proved unsatisfactory.

The elastomeric material may be any compressible and elastic material which will withstand the pressures involved and which are inert to the compartment pressurizing medium employed, such as natural or synthetic rubbers. The elastomeric material is molded or otherwise bonded to the rotor and vane components with suitable bonding agents providing a firm adhesion between the interfaces of the rotor assembly and the elastomeric material.

An improvement in operating efficiency may be obtained by further minimizing friction by coating the surface of the housing, the vane peripheries, or both with various dry film lubricants, such as graphite, molybdenum disulfides and "Teflon." Liquid lubricants, such as silicone releasing agents and various conventional lubricating oils may also be employed, depending upon their compatibility with the material of construction and conditions of operation of the actuator unit.

Thus by employing sealing means bonded only to the rotor and vanes to thereby render the vane compartments leakproof, I provide actuator means of simple construction requiring neither grooves nor seal seats, thus reducing the cost of manufacturing the units and effectingly seal the vane chambers for various applications wherein the rotor is subjected to continuous oscillation for extended periods of time.

The elastomeric contacting seal faces eliminate the requirement for accurate finishes in the housing and permit employment of actuator housings manufactured of precision castings rather than the heretofore required more expensive machined housings. By applying the sealing means only to the vanes and rotor, the cost of manufacturing is further reduced, since the seal means may be bonded by simple molding techniques.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. An oscillatory member adapted for use with servomechanism actuator units comprising: a shafted rotor, a plurality of vanes carried by said rotor and elastomeric material covering the rotor and vane portions adapted to cooperate with the housing of an actuator unit to define pressurizable vane compartments, the peripheral edges of said vanes being grooved to receive and seat a portion of said elastomeric material.

2. An oscillatory member adapted for use with servomechanism actuator units comprising: a vaned and shafted rotor; at least one groove formed in the peripheral edges of the vanes carried by said rotor adapted to seat elastomeric seal material, elastomeric seal material received and seated in said groove for providing a wiping surface contact with the housing of an actuator unit to prevent leakage thereacross from one vane compartment to another, the opposed major surfaces of said strip being in cross-section divergently tapered inwardly from said wiping contact surface, and elastomeric material covering the remainder of said rotor adapted to cooperate with the housing of an actuator unit to define pressurizable rotor vane compartments.

3. An oscillatory member adapted for use with servomechanism actuator units of flight stabilization and control components comprising: a shafted rotor; a plurality of vanes carried by said rotor and an elastomeric material covering at least the outer sides and peripheral edges of each of said vanes and adapted to cooperate with the housing of an actuator unit to define vane compartments pressurizable at high pressures suitable therefor, the elastomeric material for each of said vanes having a peripheral, flat surface disposed perpendicularly to the plane of the vane associated therewith, and diverging opposed pressure surfaces extending from the said peripheral flat pressure surface and intersecting said plane of the vane at an angle which is from 20° to 40°, the elastomeric material for each of said vanes being abrasion resistant and deformable in response to pressure on said opposed pressure surfaces to deform and press said flat surface radially outwardly into correspondingly increased sealing pressure relationship with the housing to prevent passage of fluid from one high pressure compartment to an adjacent high pressure compartment.

4. A servomechanism actuator unit for actuation of flight stabilization and control components and the like comprising: an actuator housing; a substantially centrally located chamber in said housing; at least one branch rotor vane receiving chamber radiating from said central chamber; an oscillatory shafted rotor in said central chamber carrying at least one vane for separating said branch chamber into a pair of high pressure compartments; and an elastomeric seal material covering the rotor and vanes and including a peripheral portion for each of the vanes backed by the vanes and defining a peripheral flat surface disposed perpendicularly to the plane of the vane and opposed diverging pressure surfaces for each of the vanes extending from the peripheral, flat surface and intersecting said plane of the vane at an angle of from 20° to 40° and such as to compress the elastomeric material therebetween in response to pressure in said compartments and to urge said flat pressure surface outwardly into correspondingly increased pressure relationship with the housing whereby to afford a seal for high pressure.

5. In an oscillatory servomechanism actuator unit for high pressure control of flight control surfaces of air and space borne vehicles and the like, and including a housing, a shaft journalled in said housing, at least one vane on said shaft and means for alternatingly applying high pressure surges on opposite sides of said vane, a seal construction for said vane comprising an elastomeric material peripherally secured to said vane and including a peripheral flat surface perpendicular to the plane of the vane and in sealing relation with the housing, and a pair of opposed diverging pressure surfaces extending from said peripheral flat surface and intersecting said plane of the vane at an angle of from 20° to 40° and such as to deform the flat surface radially outwardly into correspondingly increased sealing relation with the housing in response to pressure against the said opposed surfaces.

6. An oscillatory rotor assembly adapted for use with servomechanism actuator units comprising: a rotor carrying at least one vane, and a covering of elastomeric material encompassing the area thereof adapted to cooperate with the housing of the actuator unit to define pressurizable rotor vane compartments, the elastomeric material encompassing the periphery of the vane providing a flat peripheral edge surface perpendicular to the plane of said vane, and opposed diverging pressure surfaces extending from said flat edge surface and intersecting said plane of the vane at an angle of from 20° to 40° and such as to deform the flat wiping edge outwardly into increased sealing relation with the housing in response to pressure against said opposed surfaces.

References Cited in the file of this patent

UNITED STATES PATENTS

| | | |
|---|---|---|
| 1,965,564 | Bannister | July 10, 1934 |
| 2,302,109 | Dodge | Nov. 17, 1942 |
| 2,339,042 | Anderson | Jan. 11, 1944 |
| 2,511,501 | Floraday | June 13, 1950 |
| 2,553,973 | Keller et al. | May 22, 1951 |
| 2,708,911 | Oishei | May 24, 1955 |

FOREIGN PATENTS

| | | |
|---|---|---|
| 921,721 | France | Jan. 13, 1947 |
| 822,380 | Germany | Nov. 26, 1951 |